(12) United States Patent
Krocker et al.

(10) Patent No.: US 7,383,158 B2
(45) Date of Patent: Jun. 3, 2008

(54) HVAC SERVICE TOOL WITH INTERNET CAPABILITY

(75) Inventors: Robert E. Krocker, Stoddard, WI (US); Terence D. Baier, La Crosse, WI (US); Merle A. Renaud, Onalaska, WI (US); Paul C. Rentmeester, La Crosse, WI (US); Robert M. Swanson, La Crosse, WI (US); Patrick J. Wilson, La Crosse, WI (US); Kirk W. Johnson, Prairie Du Sac, WI (US)

(73) Assignee: Trane International Inc., New York, NY (US)

( * ) Notice: Subject to any disclaimer, the term of this patent is extended or adjusted under 35 U.S.C. 154(b) by 773 days.

(21) Appl. No.: 10/125,364

(22) Filed: Apr. 16, 2002

(65) Prior Publication Data

US 2003/0195640 A1 Oct. 16, 2003

(51) Int. Cl.
*G06F 11/30* (2006.01)
*G06F 15/00* (2006.01)
*G06F 11/00* (2006.01)
*G21C 17/00* (2006.01)
*G05B 11/01* (2006.01)

(52) U.S. Cl. ............ 702/186; 702/183; 702/188; 700/17

(58) Field of Classification Search ............ 701/29, 701/32, 33, 36; 600/300; 607/30; 340/459, 340/505, 525; 702/183, 184, 188; 706/45; 700/9, 10, 17, 65, 83; 709/223, 224
See application file for complete search history.

(56) References Cited

U.S. PATENT DOCUMENTS

| | | | |
|---|---|---|---|
| 4,470,266 A | 9/1984 | Briccetti et al. |
| 4,688,388 A | 8/1987 | Lower et al. |
| 4,942,613 A | 7/1990 | Lynch |
| 5,042,265 A | 8/1991 | Baldwin et al. |
| 5,128,855 A | 7/1992 | Hilber et al. |
| 5,161,608 A | 11/1992 | Osheroff |
| 5,224,648 A | 7/1993 | Simon et al. |
| 5,237,305 A | 8/1993 | Ishikuro et al. |
| 5,279,458 A | 1/1994 | DeWolf et al. |
| 5,347,821 A | 9/1994 | Oltman et al. |
| 5,355,691 A | 10/1994 | Sullivan et al. |

(Continued)

OTHER PUBLICATIONS

Trane, "Everyware™ Service Software", Product Data Sheet BAS-PD-6, Jun. 1994.

(Continued)

*Primary Examiner*—Crystal Barnes-Bullock
(74) *Attorney, Agent, or Firm*—William O'Driscoll (57) ABSTRACT

A system for servicing a computer controlled machine comprising: a computer controlled machine including a device operable to perform a function, a controller controlling the operation of that device, and a data access port for transferring data and commands from the controller; and a service tool operably connected to the data access port, the service tool including a remote communications capability, a computer, and diagnostics and graphing software; and an expert observer system operably linked to the remote communications capability of the service tool and including historical machine data, machine sales information, software revisions for the controller, additional diagnostics software, and an expert observer capable of providing a mentor capability to the operator of a service tool.

32 Claims, 2 Drawing Sheets

U.S. PATENT DOCUMENTS

| | | |
|---|---|---|
| 5,361,985 A | 11/1994 | Rein et al. |
| 5,419,146 A | 5/1995 | Sibik et al. |
| 5,446,677 A | 8/1995 | Jensen et al. |
| 5,495,722 A | 3/1996 | Manson et al. |
| 5,528,215 A | 6/1996 | Siu et al. |
| 5,546,301 A | 8/1996 | Agrawal et al. |
| 5,596,507 A | 1/1997 | Jones et al. |
| 5,619,183 A * | 4/1997 | Ziegra et al. ............... 340/505 |
| 6,317,039 B1 * | 11/2001 | Thomason .................. 340/505 |
| 6,363,282 B1 * | 3/2002 | Nichols et al. ............... 607/30 |
| 6,386,882 B1 * | 5/2002 | Linberg ...................... 434/262 |
| 6,599,241 B1 * | 7/2003 | Murphy ...................... 600/300 |

OTHER PUBLICATIONS

Trane, Rover™ Service Tool, Bas-PRC003-EN, Aug. 2001.

\* cited by examiner

HVAC SERVICE TOOL WITH INTERNET CAPABILITY

BACKGROUND OF THE INVENTION

The present invention is directed to a heating, ventilating and air conditioning (HVAC) system service tool with internet capabilities. More specifically, the HVAC service tool has improved diagnostic capabilities through the use of an expert observer feature and can also update itself and the HVAC system with the latest software upgrades. Additionally, the latest diagnostic information, sales information, and service information can be quickly provided to the service tool.

Modern air conditioning systems are equipped with digital controllers. Often each controllable component of such a system has its own microprocessor controller, and that controller typically has at least one sensor providing a sensory input for use as a basis for the component's operation. For example, an expansion valve may have a microprocessor controller modulating the position of the expansion valve in response to superheat as sensed by one or more sensors. Usually a unit controller is provided to oversee and coordinate the operation of each component of a particular unit. For example, the unit controller may override the expansion valve controller in anticipation of a variable speed compressor's change in speed. Furthermore, a commercial or an applied air conditioning system with multiple units may include a system controller to coordinate the operation of the multiple units. From the point of view of a service technician, this is a nightmare to diagnose or troubleshoot. Exemplary control systems are sold by The Trane Company, a Division of American Standard Inc., under the trademark UCP2.

Service technicians already encounter many difficulties in servicing HVAC and building automation (BAS) equipment and systems. The location of these systems is usually in relatively inaccessible service and maintenance areas. The lighting may be poor, and the conditions may be extreme since the service and maintenance areas are often not air conditioned, heated, or protected from inclement weather.

The use of sophisticated controls on air conditioning systems raise even further difficulties. Even within a single company there are a plethora of products, accessories, and generations of controllers. The service technician needs to identify the specific HVAC equipment, perform the correct diagnostics and maintenance procedures, and appropriately repair, maintain or upgrade that equipment.

This is very challenging for an experienced service technician and even more challenging for the typical HVAC service technician who often has less than two years on the job experience.

SUMMARY OF THE INVENTION

It is an object, feature and advantage of the present invention to solve the problems of previous service tools and their use in HVAC systems.

It is an object, feature and advantage of the present invention to improve the diagnostic analysis of HVAC and BAS systems by providing an expert observer to assist an inexperienced service technician.

It is an object, feature and advantage of the present invention to provide an HVAC service tool with internet capabilities.

It is a further object, feature and advantage of the present invention to provide an HVAC service tool which can identify the HVAC equipment to which the service tool is connected and perform software upgrades and fixes for all generations of that HVAC system.

It is an object, feature and advantage of the present invention to provide an HVAC service tool which includes maintenance and efficiency measuring tests.

It is an object, feature and advantage of the present invention to provide an HVAC service tool having improved diagnostics including historical, current and real time graphing capabilities.

It is an object, feature and advantage of the present invention to provide an HVAC service tool which includes parts information and availability.

It is an object, feature and advantage of the present invention to provide an HVAC service tool which can benchmark the system which the service tool is presently analyzing in comparison to other similar systems.

It is an object, feature and advantage of the present invention to provide a service technician with appropriate sales, repair and replacement information in response to an identified problem.

It is an object, feature and advantage of the present invention to allow an HVAC unit to be simultaneously monitored by a service technician at the job site as well as by a remote observer.

It is an object, feature and advantage of the present invention to allow a service technician to easily graph multiple pieces of live data versus time to aid in diagnosing an HVAC system problem.

It is an object, feature and advantage of the present invention to allow a service technician to easily graph multiple pieces of historical data over time to aid in diagnosing an HVAC system problem.

It is an object, feature and advantage of the present invention to provide a diagnostic HVAC service tool which shows the precise value of data being measured and the relationship of that data to associated trip points and limit points.

It is an object, feature and advantage of the present invention to provide an HVAC service tool which can provide a graphical overview of the entire HVAC system with associated temperature sensors, pressure sensors, and mechanical actuators.

It is an object, feature and advantage of the present invention to provide the capability to exercise HVAC system components directly via a manual override commands.

It is an object, feature and advantage of the present invention to provide up-to-date service literature, installation operation and maintenance manuals, wiring diagrams, and service bulletins while at a job site.

The present invention provides a diagnostic system. The diagnostic system comprises an on-site service tool operatively connected to and capable of interfacing with a process system and obtaining data and/or information from the process system; a display associated with the service tool and operatively capable of displaying the data and/or information; an on-site technician operating the on-site service tool and reviewing a remote service tool's data and/or information; a remote duplication capability remotely duplicating to the remove service tool the data and/or information displayed by the display or obtained from the process system; and an off-site observer operating the remote service tool and receiving the data and/or information from the remote duplication capability and providing instructions and/or advice to the on-site technician.

The present invention also provides a portable service tool. The portable service tool comprises a body; and first, second and third communication systems within the body. Each communication system has a respective first, second and third external port. The service tool includes a diagnostics function operably connected to the first, second, and third communications systems, and located within the body operable to receive data from the first system, to analyze said data, and to forward the analyzed results to the second and third communications systems. The third communication system includes a remote communications facility, the second communication system is connected by the second port to a service technician, and the first communication system receives analog and/or digital data.

The present invention further provides a method of servicing an automated system. The method comprises the steps of: dispatching a service technician to the automated system; connecting a portable service tool to the automated system; connecting the service tool via a remote link to a remote location; performing diagnostics on the automated system; forwarding the results of the diagnostics to the remote location; analyzing the diagnostic results at the remote location; and providing advice and direction to the service technician from the remote location.

The present invention still further provides a method of improving diagnostics of an HVAC system. The method comprises the steps of: providing a field service technician at the location of the HVAC system; linking an expert observer at a remote site to the field service technician; analyzing the HVAC system on location; substantially simultaneously providing the analysis to both the service technician and the expert observer; analyzing the results at the remote site using the expert observer; and providing the analysis from the expert observer to the service technician at the HVAC system location.

The present invention yet further provides a system for servicing a computer controlled machine. The system comprises a computer controlled machine including a device operable to perform a function, a controller controlling the operation of that device, and a data access port for transferring data and commands from the controller. The system also comprises a service tool operably connected to the data access port. The service tool includes a remote communications capability, a computer, and diagnostics and graphing software. The system further comprises an expert observer system operably linked to the remote communications capability of the service tool and including historical machine data, machine sales information, software revisions for the controller, additional diagnostics software, and an expert observer capable of providing a mentor capability to the operator of a service tool.

The present invention moreover provides a service arrangement. The arrangement comprises a computer or control system; a local observer in proximity to the system and operatively capable of accessing, maintaining, repairing, modifying, servicing, or upgrading the system; a remote observer located elsewhere; and a service tool operatively capable of providing data and/or information to the local and remote observers, receiving data and information from the local observer and modifying the system accordingly.

The present invention additionally provides a method of servicing, upgrading or maintaining a computer or control system. The method comprises the steps of: monitoring, analyzing, servicing or diagnosing a computer or control system to obtain specific information about the status, condition and operational capabilities of the system; providing, substantially at the same time, the information to a local observer in the area of the system and to a remote observer located out of the proximity of the system; and communicating advice or commentary from the remote observer to the local observer.

DETAILED DESCRIPTION OF THE DRAWINGS

The present invention is directed to an improved service tool 10 for an HVAC or BAS system 12 where the service tool 10 includes a remote communications capability 14 such as a phone line and modem or a wireless internet connection. Service tools without the remote communications capability are and have been sold by Trane, a Division of American Standard Inc., under the trademarks Rover and Everyman. BAS systems are marketed by Trane under the trademark Tracer and HVAC systems are marketed by Trane under many trademarks including, but not limited to: CenTraVac, Horizon, Series R, Voyager, Trane, Heritage, Alliance, VariTrane and VariTrac.

Using the improved service tool 10 of the present invention, a relatively inexperienced service technician 22 can connect the service tool 10 to the system 12, and operate the service tool 10 by means of a keyboard and display 13, shown physically separate from the service tool 10 for clarity but preferably implemented as a laptop computer. The service tool 10 includes diagnostic software, firmware, or hardware so that the operation of the system 12 can be analyzed. By displaying the results of that analysis to the service technician 22 and by also simultaneously forwarding the results of the analysis to a remotely located expert observer 16 via the remote communications capability 14, the remote communications capability 14 allows the expert observer 16 (with a second service tool 18 similar in capability and design to the service tool 10 at the job site 20) to monitor and advise the service technician 22. The expert observer 16 can then aid the relatively inexperienced service technician 22 in diagnosing or troubleshooting the operation of the system 12.

The present invention is described in terms of an applied chiller system that is intended to encompass all HVAC and BAS systems. However, the system 12 can be implemented in a multiplicity of physical embodiments including applied systems, packaged systems, rooftop systems, residential air conditioners, self contained systems, and split systems. Furthermore, the concept of the present invention is applicable to process systems, to remotely located equipment, and to facilities requiring service or maintenance by skilled technicians. Various complexity of controls are contemplated from individual component controls through unit controls, system controls and global system coordinators. A building automation system (BAS) is contemplated to link the multiple components into a control system. Exemplary systems are shown in applicant's U.S. Pat. Nos. 5,347,821 to Oltman et al.; 5,355,691 to Sullivan et al.; 5,419,146 to Sibik et al. and 5,224,648 to Simon, deceased et al. These references are commonly assigned with the present invention and are incorporated by reference.

The system 12 in the preferred implementation of the present invention includes an evaporator 30, a condenser 32 and a compressor 34, all serially linked into a refrigeration system, but a person of skill will recognize that the system 12 will vary in its implementation dependant upon the application and environment to which the invention is applied. In the described embodiment of FIG. 1, the evaporator 30 cools a fluid such as water in a water loop 36, and the fluid in the water loop 36 is used as a heat transfer medium. An air conditioning device 38 such as an air handling unit, a water source heat pump, a fan coil or the like uses the fluid in water loop 36 to condition air. A refrigerant in the evaporator 30 vaporizes in absorbing heat from the fluid in the water loop 36. The vaporized refrigerant is compressed by the compressor 34, and the compressed refrigerant is condensed in the condenser 32. The condenser 32 is typically in a heat exchange relationship with a second water loop 40 and a cooling tower 42 or other heat sink. The cooling tower 42 is used to dispose of the excess heat acquired by a fluid in the water loop 40 during the process of cooling the compressed refrigerant. A control panel 44 is typically attached to the system 12 and includes temperature sensors 46, pressure sensors 48, and actuators 50 for monitoring and controlling the operation of a system 12.

The system 12 typically includes a diagnostic program or programs in software, firmware, or hardware. The particular diagnostic will vary depending on the nature, application, complexity and arrangement of the system 12. An example of such a diagnostic with reference to a commercial rooftop system is shown in U.S. Pat. No. 5,042,265 to Baldwin et al. This reference is commonly assigned with the present invention and is hereby incorporated by reference. A person of ordinary skill in the art will recognize that other diagnostic systems are available and readily usable in accordance with the invention. Other exemplary diagnostic systems are included in the service products of Trane under the trademarks Rover and Everyman.

Service tools with some wireless capability have been previously considered as shown by applicant's U.S. Pat. No. 5,361,985 to Rein et al. which is commonly assigned with the present invention and incorporated by reference herein. The present invention's use of an expert observer 16 and a remote communications function 14 immeasurably improves the operation of previous service tools and allows a relatively inexperienced service technician to function as an experienced technician without the necessity of having an experienced technician on site.

Figure 2:
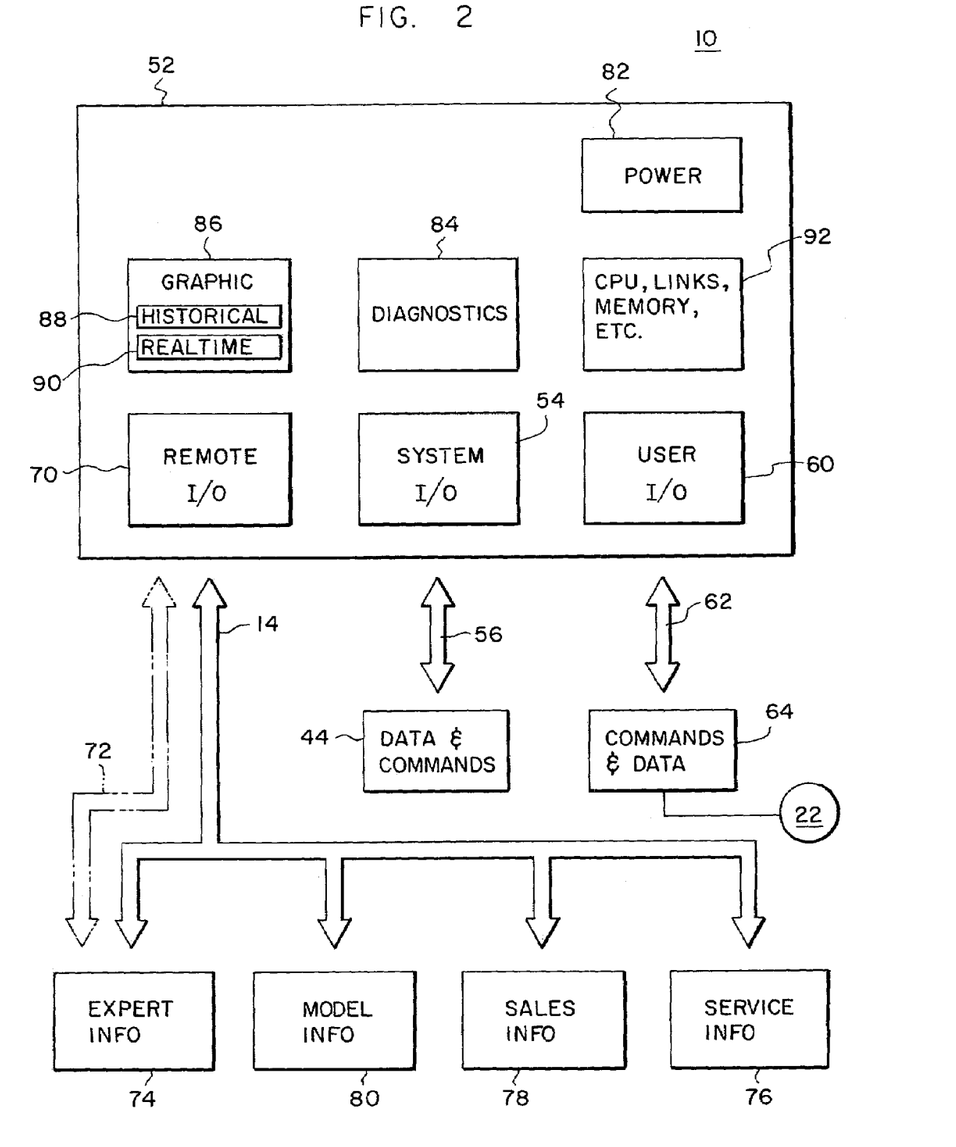
FIG. 2 is a block diagram of the service tool of FIG. 1 and its relationship to the HVAC system in the remote site.

Referring to FIG. 2, the service tool 10 of the present invention is implemented in a conventional laptop computer 52 which is preferably hardened to withstand the rigors of a service and maintenance environment. The laptop 52 includes a first port 54, preferably an RS232 port, for communicating with any one of a multiplicity of controllers 44. The physical link 56 between the first port 54 and the controller 44 allows the service tool 10 to exchange data and commands with the controller 44 regarding the HVAC system 12. The laptop 52 includes the diagnostic and software templates providing a communications protocol for communication with any particular system 12.

The service tool 10 includes a second port 60 for user input/output communications 62 with the service technician 22 by means of a conventional human/interface such as a keyboard, mouse and display 64. A handheld device such as a palm is also contemplated.

The service tool 10 includes a third port 70 including a modem allowing remote communications with a network, an intranet, or the internet, all generically referred to as the remote communications capability 14. The remote communications capability 14 allows the same information being provided through the second "user" port 60 to also be echoed 72 through of the third "remote communications" port 70 to the expert observer 16. The third remote communications port supports two way traffic and allows the expert observer 16 to provide expert diagnostics information 74 through the remote communications facility 14. Additionally, the service technician 22 can obtain service information 76 or sales information 78 as well as model and parts information 80 through the remote communications facility 14.

The service tool 10 includes a self contained source of power and/or an AC power connection, both generally indicated by a block 82.

The service tool 10 also includes a diagnostics function indicated by block 84 and a graphing function 86 including the capability to graph both historical graphs 88 and real time graphs 90. The service tool 10 preferably also includes the typical personal computer components and functions including memory, a CPU, and circuits and software containing and linking the other components of the service tool. This is generally indicated by block 92.

Figure 1:
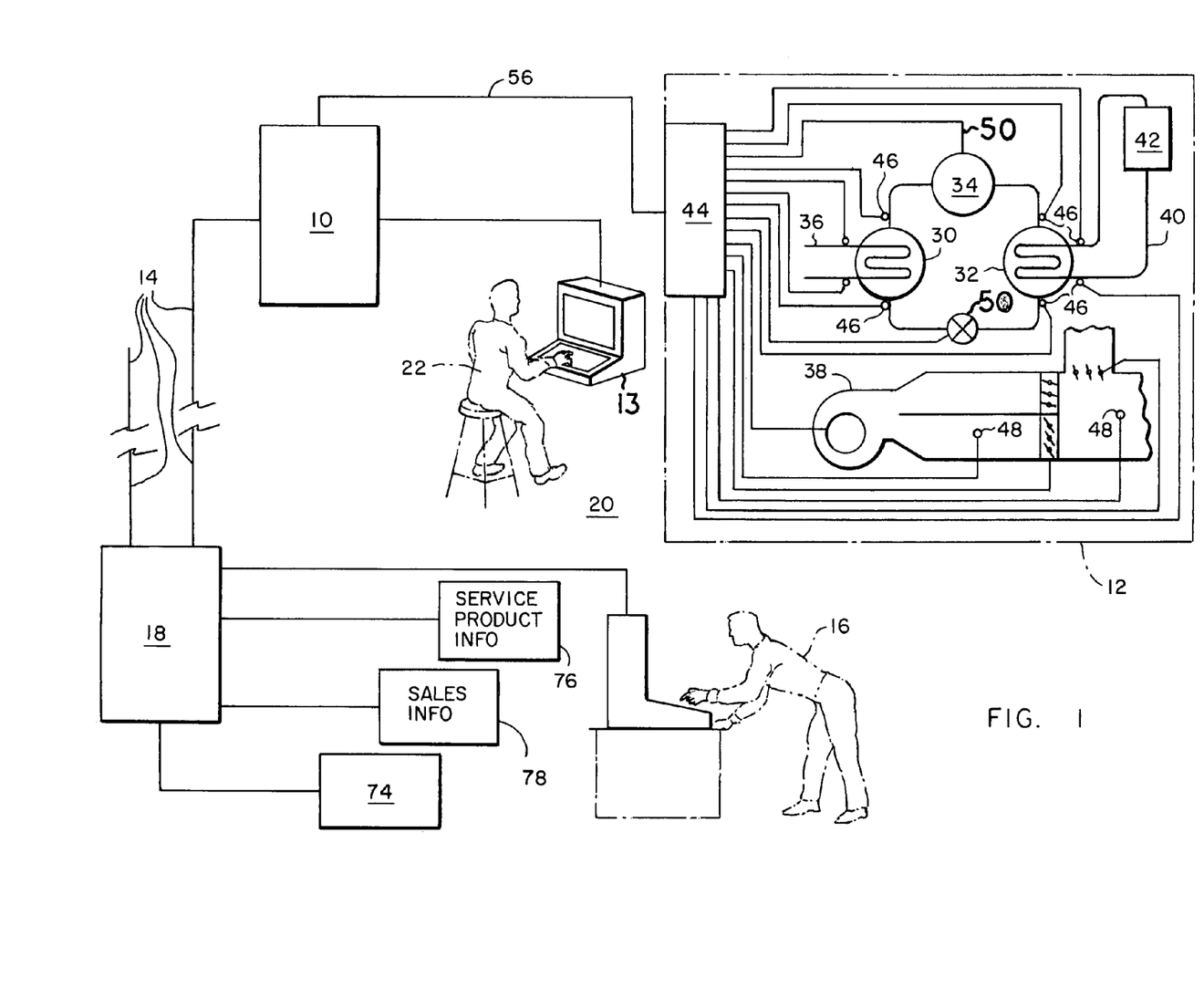
FIG. 1 shows a perspective view of an HVAC system, a service tool, an expert observer in accordance with the present invention.

The operation of the present invention is described as follows: A service technician 22 is dispatched to the HVAC system 12 at a job site 20 to diagnose a problem or to perform routine maintenance. The service technician 22 connects the service tool 10 to a controller 44 at the job site 20, connects the power supply 82 to an outlet (not shown) if an AC power supply is being used, and connects the service tool 10 to a telephone line, a cellular phone, or the like to complete the remote communications capability 14. With the service tool 10, the service technician 22 determines the type and configuration of the HVAC system 12 using information available from the controller 44. The service technician 22 determines if the software in either the controller 44 or the service tool 10 should be updated and, if so, obtains the necessary information from the service information site 76 over the remote communications facility 14. The service technician 22 then ensures that an echo function 72 is operable and that the service tool 10 is in communication with the expert observer 16. The service technician 22 initiates the diagnostics function 84.

The diagnostics function 84 initiates preset routines which, dependent upon the product and configuration, exercise each function and feature of the HVAC system 12 and, preferably, provide graphical representations of the results through the graphing function 86 to the service technician 22 and to the expert observer 16. The expert observer 16 than advises and guides the service technician 22 in maintaining, repairing, troubleshooting or studying the system 12 as needed. Once the problem is identified and direction provided, the expert observer 16 can break communication with the service technician 12.

The expert observer 16 is able to remotely supervise a number of service techs 22 and thereby increase the knowledge base and the experience base being used to analyze the results of the diagnostic function 84. Once a problem is identified or maintenance requirements determined, a decision is made as to whether repair of a component, replacement of a component, or upgrade of the component or the system 12 is the appropriate course of action. If the owner's decision is required, parts availability can be determined from the block 80 and sales information can be determined from the block 78. Additionally, the appropriate service information for the specific repair, upgrade or replacement is provided from the service function block 76. A quick and comprehensive cost estimate can immediately be provided to the owner.

The union of the remote communications facility 14 with the service tool 10 as well as the expert observer 16 tremendously increases the capability, efficiency and performance of not just one but all of the service technicians 22 using a service tool 10 in accordance with the present invention. The experienced expert observer 16 is much more likely than an inexperienced service technician 22 to detect an anomaly or to recognize a pattern from the real time or historical graphs. Additionally, the provision of the same material through the echo function 72 to both the service technician 22 and the expert observer 16 ensures that each is operating with a full set of information. This serves to both educate the service technician 22 by focusing on the most appropriate items of data in the multiplicity of data provided by the diagnostics function 84, and also to avoid the waste of the expert observer's 16 time in travelling to a job site 20 and performing the basic setup functions.

What has been described is a novel and unique HVAC service tool 10 including remote communications facilities and expert observer functions. It will be apparent that the service tool applies to all HVAC and BAS systems and can be modified in a variety of ways including the nature of the laptop used, the capabilities of a laptop and the various data provided over the remote link. The remote link itself can be modified from the use of a conventional phone line to use a cellular phone, a satellite uplink and downlink to the second service tool 18. Additionally, the second service tool 18 need not be a substantially identical counterpart to the service tool 10 but can be implemented on a functional basis in a wide variety of computers. The service tool of the present invention can be modified for non-HVAC and non-BAS applications, so that the benefits of the present invention can be used to analyze complex systems needing repair or maintenance. All such modifications and alterations are contemplated to fall within the claimed invention.

What is claimed for Letters Patent of the United States is set forth in the following claims:

1. A diagnostic system comprising:
   an on-site service tool operatively connected to and capable of interfacing with a process system and obtaining data and/or information from the process system;
   a display associated with the service tool and operatively capable of displaying the data and/or information;
   an on-site technician operating the on-site service tool and reviewing the data and/or information;
   a remote service tool;
   a remote duplication capability remotely duplicating to the remote service tool the data and/or information displayed by the display or obtained from the process system;
   an off-site observer operating the remote service tool and receiving the data and/or information from the remote duplication capability and providing instructions and/or advice to the on-site technician; and
   a remote communicator link of the remote service tool wherin the off-site observer can send information, data, and commands to the on-site technician by means of the remote communicator portion wherein the on-site service tool is operatively capable of receiving software upgrades, software fixes, sales, repair, and replacement information, and parts information and availability by transmissions over the remote link from the remote service tool; and
   wherein either of the remote or the on-site service tools are operatively capable of performing maintenance and efficiency measuring test, including historical, current and real time graphing capabilities, including the capability to benchmark the process system in terms of other similar systems, and showing the present value of data being measured and the relationship of that data to associated trip points and limits.

2. The system of claim 1 wherein the off-site observer communicates with the on-site technician by wired or wireless telephones.

3. The system of claim 1 wherein the on-site technician is relatively inexperienced and wherein the off-site observer is relatively expert.

4. The system of claim 1 wherein the on-site service tool is operatively capable of receiving software upgrades and software fixes over the remote link and installing said software upgrades and software fixes in the process system.

5. The system of claim 4 wherein the software upgrades, software fixes, sales, repair, and replacement information, and parts information and availability are transmitted over the remote link from the remote service tool.

6. The system of claim 1 wherein the process system is an HVAC or BAS system.

7. A method of servicing an automated system comprising the steps of:
   dispatching a service technician to the automated system;
   connecting a portable service tool to the automated system;
   connecting the service tool via a remote link to a remote location;
   performing diagnostics on the automated system;
   forwarding the results of the diagnostics to the remote location;
   analyzing the diagnostic results at the remote location; and
   providing advice and direction to the service technician from the remote location using the internet;
   wherein the analyzing step includes diagnostics including historical, current and real time graphic capabilities.

8. A method of servicing an automated system comprising the steps of:
   dispatching a service technician to the automated system;
   connecting a portable service tool to the automated system;
   connecting the service tool via a remote link to a remote location;
   performing diagnostics on the automated system;
   forwarding the results of the diagnostics to the remote location;
   analyzing the diagnostic results at the remote location;
   providing advice and direction to the service technician from the remote location using the internet; and
   benchmarking the system being analyzed in terms of other similar systems.

9. The method of claim 8 wherein the service technician is inexperienced.

10. The method of claim 8 including the further steps of performing maintenance and efficiency measuring tests.

11. The method of claim 8 wherein the remote location includes an additional service tool and including the further step of displaying diagnostic results on both of the additional and the portable service tools.

12. The method of claim 8 including the further step of providing the service technician with sales, repair and replacement information in response to an identified problem.

13. A method of servicing an automated system comprising the steps of:
   dispatching a service technician to the automated system;
   connecting a portable service tool to the automated system;

connecting the service tool via a remote link to a remote location;

performing diagnostics on the automated system;

forwarding the results of the diagnostics to the remote location;

analyzing the diagnostic results at the remote location; and providing advice and direction to the service technician from the remote location using the internet; and providing up-to-date service literature, installation, operation and maintenance manuals, wiring diagrams and service bulletins to the service technician while at the location of the automated system.

14. The method of claim 13 wherein the field service technician is inexperienced.

15. The method of claim 13 including the further steps of performing maintenance and efficiency measuring tests.

16. A method of improving diagnostics of an HVAC system comprising the steps of:

providing a field service technician at the location of the HVAC system;

linking an expert observer at a remote site to the field service technician;

analyzing the HVAC system on location;

substantially simultaneously providing the analysis to both the service technician and the expert observer;

analyzing the results at the remote site using the expert observer;

providing the analysis from the expert observer to the service technician at the HVAC system location using the internet; and wherein the analyzing step includes diagnostics including historical, current and real time graphic capabilities.

17. The method of claim 16 including the further step of providing the service technician with sales, repair and replacement information in response to an identified problem.

18. A method of improving diagnostics of an HVAC system comprising the steps of:

providing a field service technician at the location of the HVAC system;

linking an expert observer at a remote site to the field service technician;

analyzing the HVAC system on location;

substantially simultaneously providing the analysis to both the service technician and the expert observer;

analyzing the results at the remote site using the expert observer;

providing the analysis from the expert observer to the service technician at the HVAC system location using the internet; and benchmarking the system being analyzed in terms of other similar systems.

19. A method of improving diagnostics of an HVAC system comprising the steps of:

providing a field service technician at the location of the HVAC system;

linking an expert observer at a remote site to the field service technician;

analyzing the HVAC system on location;

substantially simultaneously providing the analysis to both the service technician and the expert observer;

analyzing the results at the remote site using the expert observer;

providing the analysis from the expert observer to the service technician at the HVAC system location using the internet; and providing up-to-date service literature, installation, operation and maintenance manuals, wiring diagrams and service bulletins to the service technician while at the location of the HVAC system.

20. A system for servicing a computer controlled machine comprising:

a computer controlled machine including a device operable to perform a function, a controller controlling the operation of that device, and a data access port for transferring data and commands from the controller; and a service tool operably connected to the data access port, the service tool including a remote communications capability, a computer, and diagnostics and graphing software; and an expert observer system operably linked to the remote communications capability of the service tool and including historical machine data, machine sales information, software revisions for the controller, additional diagnostics software, and an expert observer capable of providing a mentor capability to the operator of a service tool; and wherein the diagnostics and graphing software has an operative capability to graph historical, current and real time data.

21. The system of claim 20 including an operative capability displaying a precise value of data being measured and the relationship of that data to associated trip points and limit points.

22. The system of claim 21 wherein the computer controlled machine is operatively connected to and controlling an HVAC or BAS system.

23. A service arrangement comprising:

a computer or control system;

a local observer in proximity to the system and operatively capable of accessing, maintaining, repairing, modifying, servicing, or upgrading the system;

a remote observer located elsewhere;

a service tool operatively capable of providing data and/or information to the local and remote observers, receiving data and information from the local observer and modifying the system accordingly and including a remote duplication capability which is operatively capable of displaying the same information to both the local and the remote observer; and means for analyzing diagnostics including historical, current and real time graphic capabilities.

24. The arrangement of claim 23 further including means for performing maintains and efficiency measuring test.

25. A service arrangement comprising:

a computer or control system;

a local observer in proximity to the system and operatively capable of accessing, maintaining, repairing, modifying, servicing, or upgrading the system;

a remote observer located elsewhere;

a service tool operatively capable of providing data and/or information to the local and remote observers, receiving data and information from the local observer and modifying the system accordingly and including a remote duplication capability which is operatively capable of displaying the same information to both the local and the remote observer; and means for benchmarking the system being analyzed in terms of other similar systems.

26. The arrangement of claim 25 further including means for providing the local observer with sales, repair and replacement information in response to an identified problem.

27. A service arrangement comprising:
a computer or control system;
a local observer in proximity to the system and operatively capable of accessing, maintaining, repairing, modifying, servicing, or upgrading the system;
a remote observer located elsewhere;
a service tool operatively capable of providing data and/or information to the local and remote observers, receiving data and information from the local observer and modifying the system accordingly and including a remote duplication capability which is operatively capable of displaying the same information to both the local and the remote observer; and
means for providing up-to-date service literature, installation, operation and maintenance manuals, wiring diagrams and service bulletins to the local observer while at the location of the system.

28. A method of servicing, upgrading or maintaining a computer or control system comprising the steps of:
monitoring, analyzing including diagnostics including historical, current and real time graphic capabilities, servicing or diagnosing a computer or control system to obtain specific information about the status, condition and operational capabilities of the system;
providing, substantially at the same time, the information to a local observer in the area of the system and to a remote observer located out of the proximity of the system; and
communicating advice or commentary from the remote observer to the local observer;
wherein the local observer receives the advice and commentary from the remote observer and monitors, analyzes, services or diagnoses the computer control system.

29. The method of claim 28 including the further step of providing the local observer with sales, repair and replacement information in response to an identified problem.

30. A method of servicing, upgrading or maintaining a computer or control system comprising the steps of:
monitoring, analyzing, servicing or diagnosing a computer or control system to obtain specific information about the status, condition and operational capabilities of the system;
providing, substantially at the same time, the information to a local observer in the area of the system and to a remote observer located out of the proximity of the system;
communicating advice or commentary from the remote observer to the local observer; and
benchmarking the system being analyzed in terms of other similar systems;
wherein the local observer receives the advice and commentary from the remote observer and monitors, analyzes, services or diagnoses the computer control system.

31. A method of servicing, upgrading or maintaining a computer or control system comprising the steps of:
monitoring, analyzing, servicing or diagnosing a computer or control system to obtain specific information about the status, condition and operational capabilities of the system;
providing, substantially at the same time, the information to a local observer in the area of the system and to a remote observer located out of the proximity of the system;
communicating advice or commentary from the remote observer to the local observer; and
providing up-to-date service literature, installation, operation and maintenance manuals, wiring diagrams and service bulletins to the local observer while at the location of the system;
wherein the local observer receives the advice and commentary from the remote observer and monitors, analyzes, services or diagnoses the computer control system.

32. The method of claim 31 including the further steps of performing maintenance and efficiency measuring tests.

* * * * *

UNITED STATES PATENT AND TRADEMARK OFFICE
CERTIFICATE OF CORRECTION

PATENT NO.         : 7,383,158 B2                                      Page 1 of 1
APPLICATION NO.    : 10/125364
DATED              : June 3, 2008
INVENTOR(S)        : Robert E. Krocker et al.

It is certified that error appears in the above-identified patent and that said Letters Patent is hereby corrected as shown below:

Claim 24, Column 10, Line 51, "maintains" should read --maintenance--.

Signed and Sealed this

Twenty-eighth Day of July, 2009

JOHN DOLL
*Acting Director of the United States Patent and Trademark Office*